US012352078B2

(12) United States Patent
Andersen

(10) Patent No.: US 12,352,078 B2
(45) Date of Patent: Jul. 8, 2025

(54) CHILD SAFETY LOCK

(71) Applicant: Jesper Birk Andersen, Kowloon (CN)

(72) Inventor: Jesper Birk Andersen, Kowloon (CN)

(*) Notice: Subject to any disclaimer, the term of this patent is extended or adjusted under 35 U.S.C. 154(b) by 91 days.

(21) Appl. No.: 18/108,881

(22) Filed: Feb. 13, 2023

(65) Prior Publication Data

US 2023/0295960 A1 Sep. 21, 2023

(30) Foreign Application Priority Data

Mar. 15, 2022 (GB) ..................................... 2203591

(51) Int. Cl.
*E05B 65/00* (2006.01)
*E05B 65/46* (2017.01)

(52) U.S. Cl.
CPC .......... *E05B 65/0014* (2013.01); *E05B 65/46* (2013.01)

(58) Field of Classification Search
CPC ...... E05B 65/0014; E05B 65/44; E05B 65/46; E05B 65/48; E05B 2009/002; E05B 63/0026; E05B 19/002; A47B 88/50; A47B 88/57; A47B 2067/025; A47B 77/00; E05C 19/18; E05C 19/184; E05C 19/188; E05C 7/04; Y10T 7/5097; Y10T 7/5102; Y10T 7/5106
USPC ................................. 292/288, 292, DIG. 37
See application file for complete search history.

(56) References Cited

U.S. PATENT DOCUMENTS 1,378,622 A * 5/1921 Sarbij ................. E05B 17/2038 292/150
2,665,935 A * 1/1954 Patterson .............. E05C 19/184 292/292
3,909,051 A * 9/1975 Nakai ..................... E05C 1/166 292/336.3
4,190,273 A * 2/1980 Schaffrin ................ E05B 65/48 292/288
5,664,814 A * 9/1997 Lin ....................... E05C 19/182 292/296
5,836,626 A 11/1998 Coy
6,036,242 A 3/2000 Lin
(Continued)

FOREIGN PATENT DOCUMENTS

CN 201152097 Y * 11/2008
CN 214576358 U * 11/2021
(Continued)

OTHER PUBLICATIONS

United Kingdom Examination Report issued by the United Kingdom Intellectual Property Office for application GB2301518.3 on Jul. 4, 2023. (Year: 2023).*
(Continued)

*Primary Examiner* — Kristina R Fulton
*Assistant Examiner* — Emily G. Brown
(74) *Attorney, Agent, or Firm* — Lippes Mathias LLP

(57) ABSTRACT

A child safety lock for a door or drawer includes a latch part and a catch part, the latch part configured to be fitted on a fixed frame member and including a latching protrusion including a through hole for receiving at least one spring biased bolt of the catch part, the catch part including a slot which receives the latching protrusion, wherein the at least one spring biased bolt extends across the slot and into the hole when the latching protrusion is located in the slot to lock the catch part to the latching protrusion. At least one user operable button is provided which, when pressed, causes the at least one spring biased bolt to retract wherein a secondary lock must be first engaged by the user before the bolt can be released.

15 Claims, 6 Drawing Sheets

(56) References Cited

U.S. PATENT DOCUMENTS

| | | | | |
|---|---|---|---|---|
| 6,755,450 | B1 * | 6/2004 | Chen | E05C 19/182 292/289 |
| 10,876,332 | B2 * | 12/2020 | Jones | E05C 7/04 |
| 11,140,947 | B2 * | 10/2021 | Chen | A44B 11/266 |
| 2003/0067173 | A1 * | 4/2003 | Magnusson | E05C 17/48 292/164 |
| 2017/0022737 | A1 * | 1/2017 | Andersen | E05C 1/166 |
| 2018/0075679 | A1 | 3/2018 | Niroomand | |
| 2020/0018097 | A1 * | 1/2020 | Andersen | A47B 88/50 |
| 2020/0332561 | A1 * | 10/2020 | Nave | E05B 67/24 |
| 2022/0205292 | A1 * | 6/2022 | Chen | E05B 65/0014 |

FOREIGN PATENT DOCUMENTS

| | | | | | |
|---|---|---|---|---|---|
| DE | 202017103507 | U1 * | 8/2017 | | |
| DE | 202021106078 | U1 | 2/2022 | | |
| GB | 2407116 | A * | 4/2005 | E05C 17/20 |
| GB | 2509899 | A * | 7/2014 | E05B 65/46 |
| GB | 2564924 | A | 1/2019 | |
| GB | 2540653 | A | 2/2021 | |
| GB | 2553270 | A | 1/2022 | |
| GB | 2600745 | A | 5/2022 | |
| WO | WO-2019029792 | A1 * | 2/2019 | A47B 88/53 |

OTHER PUBLICATIONS

Espacenet, machine translation of CN 214576358 U, generated Sep. 3, 2024 (Year: 2024).*

Espacenet, machine translation of DE 202017103507 U1, generated Sep. 3, 2024 (Year: 2024).*

Great Britain Search Report for Application No. GB2203591.9 dated Sep. 13, 2022, 2 pages.

* cited by examiner

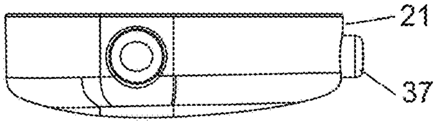
Fig.8f
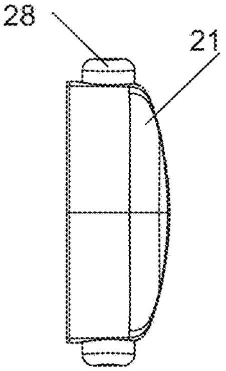
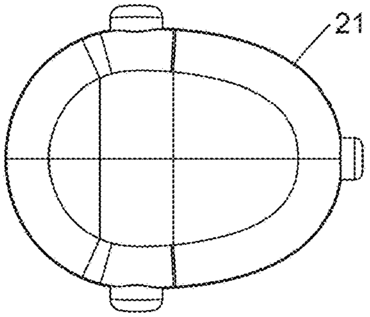
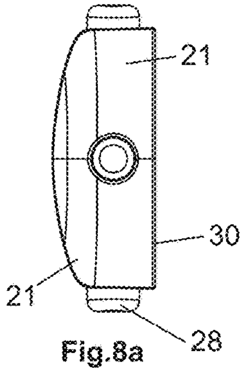
Fig.8b
Fig.8c
Fig.8a
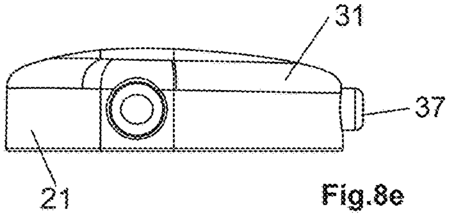
Fig.8e
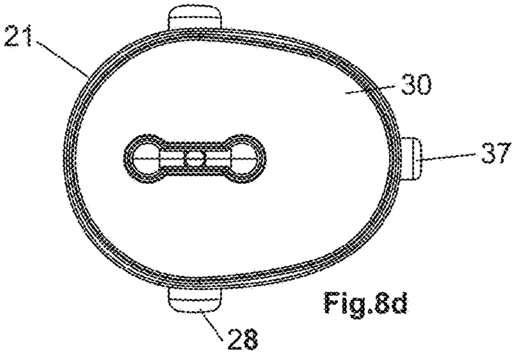
Fig.8d
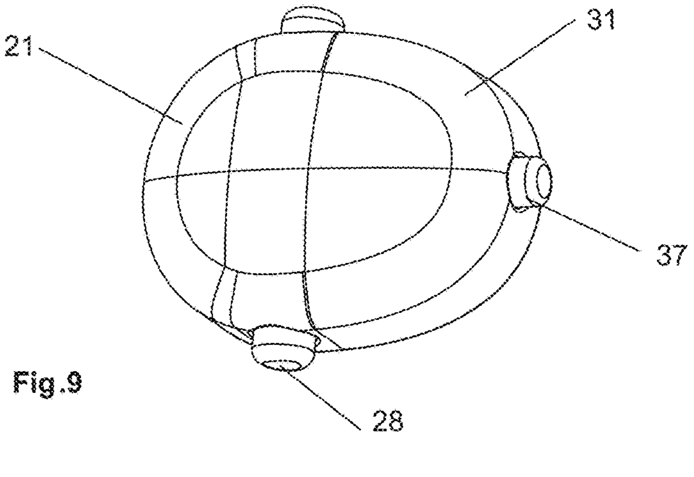
Fig.9

CHILD SAFETY LOCK

CROSS-REFERENCE TO RELATED APPLICATIONS

This application claims priority under 35 U.S.C. § 119, and the benefit of Great Britain Patent Application No. 2203591.9, filed Mar. 15, 2022 and titled "Child Safety Lock", the entirety of which application is hereby incorporated by reference as is fully set forth herein.

FIELD OF THE INVENTION

The present invention relates to a retrofittable safety lock for cupboards, cabinet doors and the like, and, more particularly, "child-proof" latches that include features which make them difficult to be actuated by small children, but not too difficult for adults to operate.

BACKGROUND (PRIOR ART)

A variety of materials are used for the work surface of kitchen cupboards and sideboards. Materials such as quartz, granite, wood, acrylic, laminate etc. are often used for their aesthetic quality and finish since these surfaces can be a very dominant feature of a room.

These sideboards are commonly used in daily life in kitchens, bedrooms, offices, etc. to store a wide range of articles, some of which may be harmful to children. Small children may also attempt to climb on, or even in, cupboards and cabinets in an effort to hide. Cupboards and cabinets may house many types of materials which may be potentially hazardous to children such as medicines, household cleaners, knives, tools, paint, etc.

To prevent young children from accessing these storage areas, numerous items have been patented and sold, most of a multi-piece assembly. Generally, some sort of a longitudinal member with a hook portion is attached to either side surface of a cupboard or cupboard handle to limit the amount the cupboard door may be opened. The hook portion may engage with the cupboard handles or fixings on the cupboard doors. A latch on the hook may be depressed by an adult to release the hook from the cupboard handles or fixings on the cupboard doors.

While the disengagement of the latch is relatively easy for an adult, the latches are intended to be difficult to manipulate by a child.

These products are also often fixed to the top inner surface of the cupboard so that they are most easily releasable from above and therefore more easily releasable by adults than small children.

Such a lock is known from GB 2553270. Adults find it difficult to correctly fix such safety locks to existing cupboards with the confidence that they have been fitted correctly and will function correctly during use and effectively prevent children accessing a cupboard and yet not make the task of an adult opening the cupboard too onerous.

STATEMENT OF INVENTION

According to the invention there is provided a retrofittable safety lock for limiting movement of one or more movable first elements with respect to a fixed second element as defined in the appended claims.

DESCRIPTION OF THE DRAWINGS

FIG. 9: shows a perspective view of the catch member of FIG. 8.

DETAILED DESCRIPTION

Figure 1A:
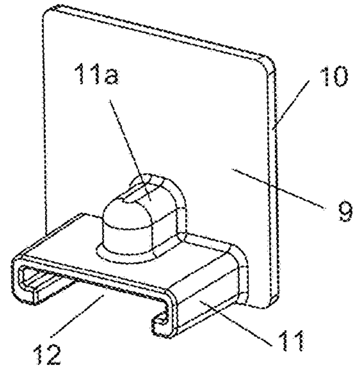
FIGS. 1*a*-1*d* (collectively referred to as "FIG. 1") show perspective views of a set of components of a first embodiment the safety lock of the invention.
Figure 1B:
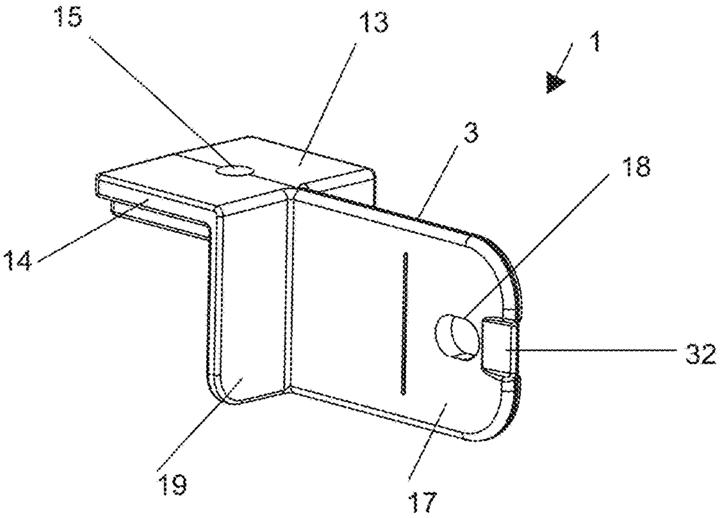
Figure 1C:
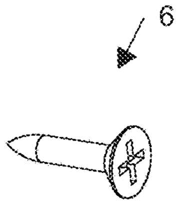
Figure 1D:
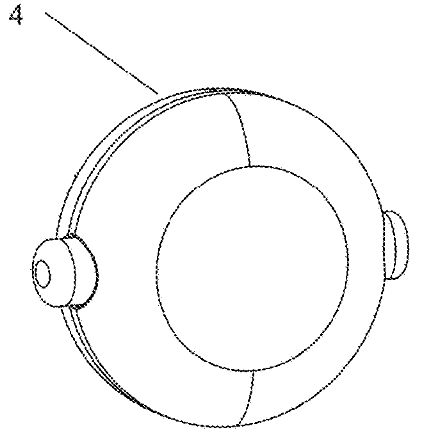
Figure 2:
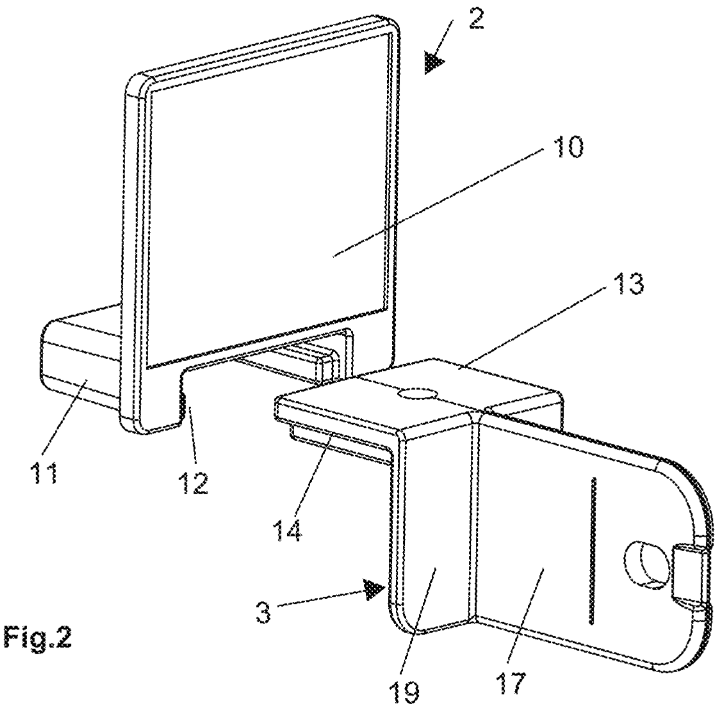
FIG. 2: shows a perspective view of a first step in the assembly of the latch member of the safety lock of the first embodiment.
Figure 3:
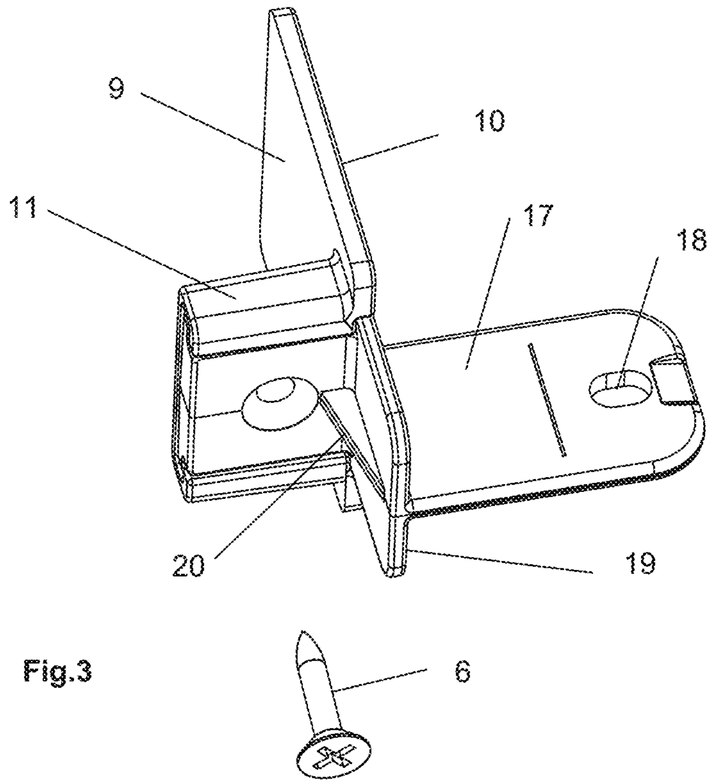
FIG. 3: shows a perspective view of a subsequent step in the assembly of the latch member of the safety lock of the first embodiment.
Figure 4:
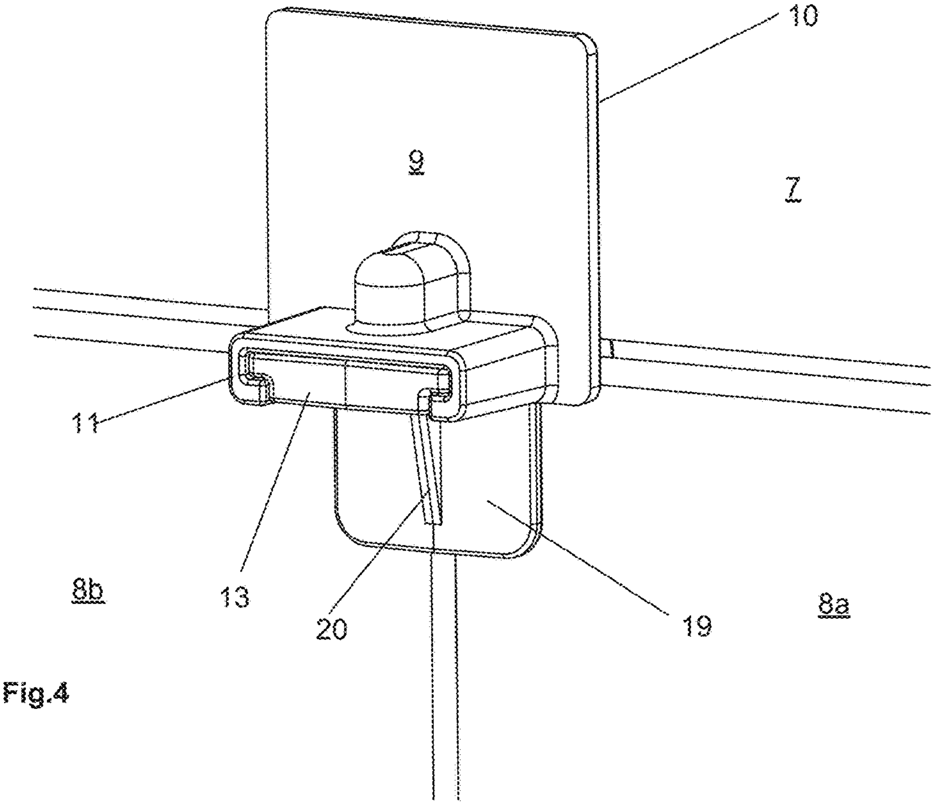
FIG. 4: shows a perspective view of the assembled latch member of the safety lock of the first embodiment located in position on the cupboard frame as seen from the inside of the cupboard.
Figure 5:
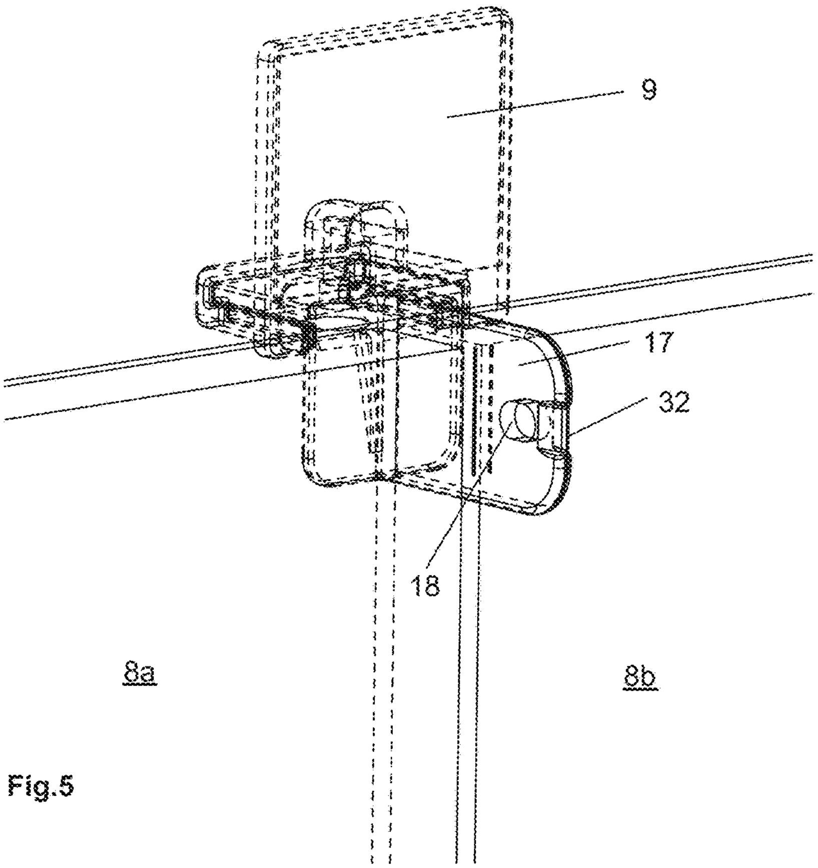
FIG. 5: shows a perspective view of the assembled latch member of the safety lock of FIG. 4, seen from the outside of the cupboard to which the safety lock is attached.

FIGS. 1 to 12 show a retrofittable safety lock 1 according to a first embodiment of the invention in its four component parts including a frame attachment member 2, a catch member 21 a screw 6, and a latch part 3. In this first embodiment the safety lock is adapted to be fitted to cupboards which comprise a wooden frame as shown in FIGS. 4 and 5 which includes a horizontal frame element 5. The term wooden is used here to include all types of manufactured artificial wood including chipboard, mdf (medium density fibreboard), and the like and other resin or glue based products exhibiting the properties of wood. Such a wooden frame element 5 typically comprises planar surface 7 being co-planar with the cupboard doors when closed. Cupboard doors or drawers 8*a*, 8*b* are arranged below the frame element 5.

In this embodiment, it can be seen that the frame attachment member 2 comprises a square shaped web 9 which provides an attachment surface 10 for securing to the planar surface of the frame element 5 preferably by means of adhesive. The relatively large surface area of at least 2 cm2 of the attachment surface 10 provides for a strong attachment of the frame attachment member 2 to the frame element 5. The frame attachment member 2 also comprises a groove housing 11 arranged orthogonally to the web 9 and comprises a groove 12 designed to receive a tongue 13 of the latch part 3, which tongue 13 comprises correspond flanges 14 on either side which snugly fit into the groove 12. The tongue 13 also comprises a through hole 15 for receiving a retaining screw 6, so that to affix the latch part 3, the user slides the tongue 13 in the groove 12 as shown best in FIG. 2. The tongue 13 and groove 12 are slid together to the fullest extent possible, as shown in FIG. 3, and as determined by corresponding stops at the end of the tongue 13 and groove 12 respectively, at which point the through hole

15 is aligned with a retaining hole (not shown) inside an abutment 11*a* of the groove housing 11. The stop means is provided by a supporting wall 19 arranged orthogonally to the tongue 13 and reinforced by an angular web 20. Thus, the user screws in the retaining screw 6 through the through hole 15 and into the retaining hole thus securing the latch part 3 to the rail attachment member in a manner in which any rotation or sideways movement is prevented. The frame attachment member 2, together with the latch part 3, is then fixedly attached to the inside surface of the frame element, preferably by means on adhesive, such that a latching protrusion 17 of the latch part 3, which in turn is arranged orthogonally to the tongue 13 and the supporting wall 19, extends outwardly between the cupboard doors (or drawers) 8*a*, 8*b*, as shown in FIGS. 6 and 7.

In FIG. 1 the latch part 3 attached to the frame element 5 in a fixed and secure state, such that the catch part 4, 21 can be engaged with the protrusion 17 by means of the latching hole 18, by the user to secure the cupboard.

Figure 6:
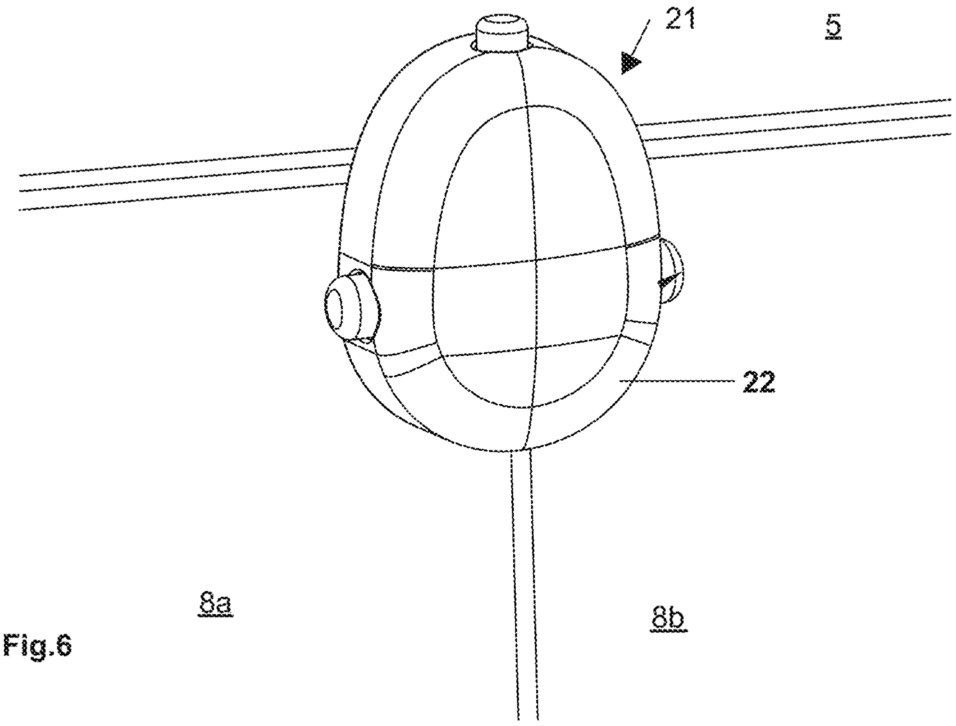
FIG. 6: shows a perspective view of the safety lock of FIG. 5 with the catch member attached.
Figure 7:
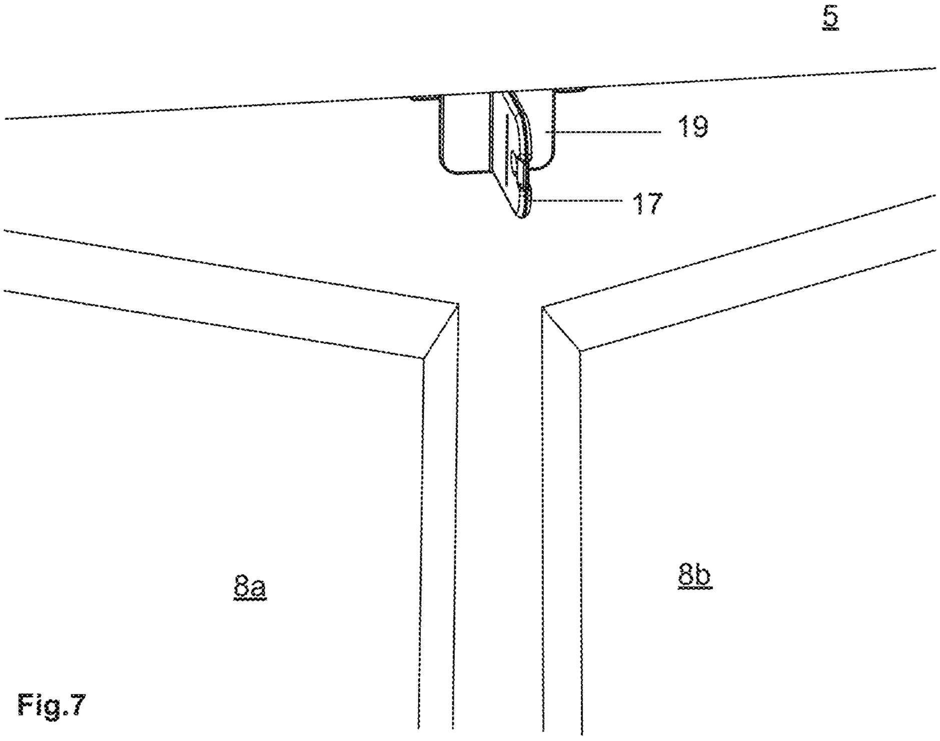
FIG. 7: shows a perspective view of the safety lock of FIG. 5 with the catch member removed and the cupboard doors open, FIGS. 8*a*-8*f* (collectively referred to as "FIG. 8") show top, bottom, front, rear and side views of a second embodiment the safety catch member of the safety lock of the invention.

An embodiment of a catch part 21 as part of the lock of the present invention is shown in more detail in FIGS. 6, and 8 to 12. The catch part 21 includes a housing 22 having an inside part 30 and an outside part 31 and which includes an open slot 24 on the inside part 30 to receive the latching protrusion 17 when the user desire to lock the cupboard with the cupboard doors 8 *a*, 8 *b* closed as shown in FIG. 6. Inside the housing 22 a pair of spring biased bolts 23 are provided, biased by respective springs 29 to move towards each other and to penetrate the latching hole 18 of the latching protrusion 17 when the latching protrusion is inserted into the slot 24 effectively preventing the doors 8 *a*, 8 *b* from being opened. Bevelled surfaces 26 are provided at the ends of the bolts 23 so that when slot 24 is aligned with the latching protrusion and the catch part 21 is pressed on the by the user, the latching protrusion 17, pushes back bolts 23 against the springs 29 which allows the catch part 21 to be pressed further until the bolts are aligned with the latching holes 18 at which point the springs 29 urge the bolts 23 into the latching holes and the catch part 21 clicks into position. Bevelled surfaces 32 are also provided at the remote end of the latching protrusion 17, and which are aligned with the bevelled surfaces 26 of the bolts 23 when the latching protrusion is located in the clot 24 to further facilitate the easy separation of the bolts 23 when the catch part 21 is pushed onto the latching protrusion 17.

Figure 10:
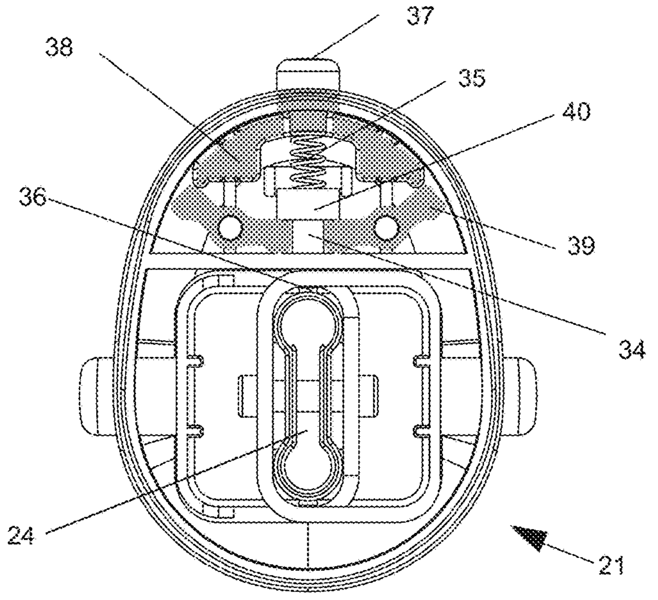
FIG. 10 shows a cross sectional view of the safety catch member of FIG. 8.
Figure 11:
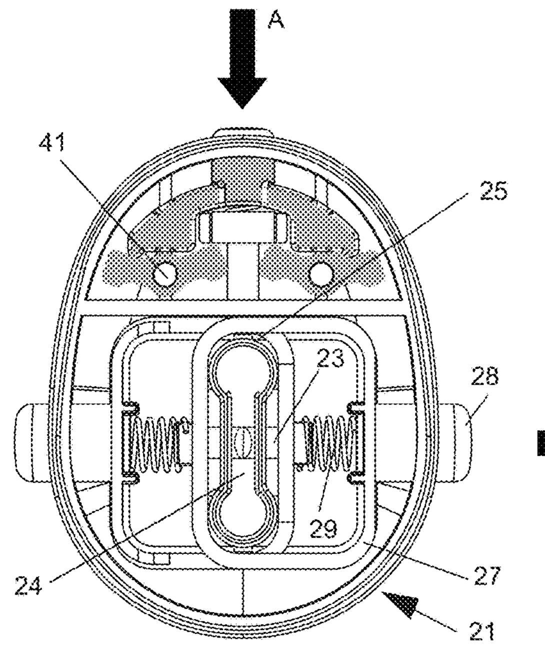
FIG. 11 shows the cross sectional view of FIG. 10 in a first position of operation, and, FIG. 12 shows the cross sectional view of FIG. 10 in a second position of operation.
Figure 12:
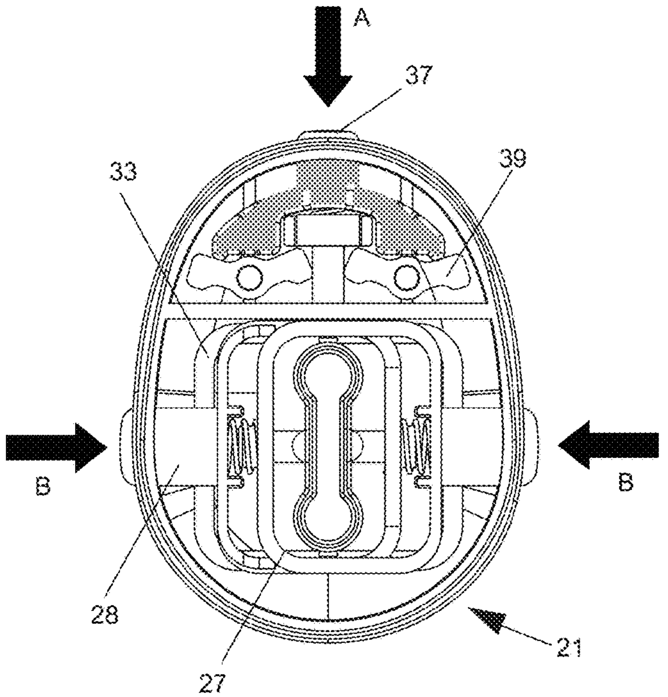

FIG. 10 shows the catch part 21 in cross section view from the side of the outside part 31 with the bolts 23 closed and the bevelled surfaces 26 of the bolts 23 not visible. FIGS. 11 and 12 show cross sectional views from the inside part 31 in which view the bevelled surfaces 26 are shown. In order to remove the catch part 21 it is necessary to simultaneously press both opposing side buttons 28. The side buttons 28 are respectively connected to mutually sliding carriage frames 27 inside which the springs 29 are mounted such that pressing in the side button 28 on one side causes the corresponding bolt 23 on the opposing side to be pushed back against its spring 29 and the bolt 23 retracts back out of the slot 24 as shown in FIG. 12. Pressing both side buttons 28 simultaneously causes both bolts 23 to be retracted out of the way of the slot 24, and out of the latching hole 18 so the catch part 21 can be removed and the cupboard doors (or drawers) 8*a*, 8*b* opened. The slot 24 comprises enlarged circular ends 25 at each end thereof which assist the location of the latching protrusion 17 in the slot 24.

The carriage frames 27 are arranged in sliding guides 33 formed in the housing 22. In the embodiment shown, movement of the carriage frames 27 is prevented by a releasable secondary lock in the form of a pin 34 which is biased by spring 35 to engage in a corresponding hole 36 in the carriage frames 27 to prevent their movement. This locked position is shown in FIG. 10. In order to release the pin 34 the users presses downwardly in the direction of arrow A as shown in FIG. 11, this causes a pair of sliders 38 arranged laterally to either side of the spring 35, to move downwardly to engage outer parts of a pair of rockers 39 which are mounted on pivots 41 so that the downward movement of the outer parts causes the upward movement of the inner parts of the rockers 39 causing them to move upwardly against the underside of an enlarged head 40 of the pin 34 against the bias of the spring 35. In this way downward movement of the top button 37 causes the pin 34 to move out of the hole 36 and out of engagement with the carriage frames 27.

Thus in order to release the catch part 21, the user is required to first press the top button 37 in the direction of arrow A, followed by the side buttons 28 together in the directions of arrow B, whilst the top button 37 continues to be pressed, as shown in FIG. 12. Only this sequence of operation will release the safety button and permit the doors to be opened. As such it serves as a very effective child safety lock because of the difficulty in learning the complex sequence combined with the requirement to use at least three digits. This can however be readily achieved by most adults.

Another advantage of the invention is that lock is secured to the frame element of the cabinet, which allows the child safety lock to be installed without making alterations or securing to the outside surface of the cupboard or drawer. This is advantageous to preserve the outside appearance of the cupboard door and avoids the need to secure anything to the panel surfaces would damage the quality of the appearance.

COMPONENT LIST

1—Safety lock
2—Frame attachment member
3—Latch part
4—Catch member
5—Frame element
6—Screw
7—Planar surface
8 *a*, 8 *b*—Cupboard doors
9—Enlarged web
10—Attachment surface
11—Groove housing
11 *a*—Abutment
12—Groove
13—Tongue
14—Flanges
15—Through hole
16—Retaining screw
17—Latching protrusion
18—Latching hole
19—Supporting wall
20—Reinforcing web
21—Catch part
22—Housing
23—Bolt
24—Slot
25—Enlargement
26—Bevelled surfaces
27—Carriage
28—Side button
29—Spring

30—Inside part
31—Outside part
32—Bevelled edge
33—Guide
34—Pin
35—Spring
36—Hole
37—Top button
38—Sliders
39—Rocker
40—Pin head
41—Pivot

The invention claimed is:

1. A child safety lock for an associated cupboard comprising at least one movable door or drawer and a fixed frame member, the lock comprising a latch part and a catch part, the latch part being configured to be fitted on a surface of the fixed frame member and including a latching protrusion extending outwardly, the latching protrusion including a through hole for receiving at least one spring biased bolt of the catch part, the catch part including a slot which receives the latching protrusion, wherein the at least one spring biased bolt extends across the slot and into the through hole when the latching protrusion is located in the slot to lock the catch part to the latch protrusion which prevents the at least one movable door or drawer from being opened and wherein at least one user operable button is provided on the catch part which, when pressed, causes the at least one spring biased bolt to retract from the through hole thus releasing the lock, said catch part further comprising a secondary lock means which must be first engaged by the user before the at least one spring biased bolt can be released;

wherein said at least one spring biased bolt comprises a pair of bolts that are releasable by operation of a pair of side buttons located on opposing sides of the catch part;

and wherein the side buttons are respectively connected to mutually sliding carriage frames inside which respective springs are mounted such that pressing in one of the side buttons of the pair of side buttons on one side of the catch part causes one of the bolts of the pair of bolts on an opposing side of the catch part to be pushed back against a respective one of the springs and be retracted back out of the slot.

2. A child safety lock according to claim 1, wherein the catch part comprises a housing having an inside part and an outside part and which inside part includes the slot to receive the latching protrusion to lock the associated cupboard with the at least one movable door or drawer closed.

3. A child safety lock according to claim 1, wherein bevelled surfaces are provided at respective ends of the pair of bolts so that when the slot is aligned with the latching protrusion and the catch part is pressed on the by the user, the latching protrusion pushes back said pair of bolts against respective springs which allows the catch part to be pressed further until the pair of bolts are aligned with the latching holes at which point the respective springs urge the pair of bolts into the latching holes and the catch part clicks into position.

4. A child safety lock according to claim 1, wherein bevelled surfaces are also provided at a remote end of the latching protrusion to further facilitate retraction of the at least one spring biased bolt when the catch part is pushed onto the latching protrusion.

5. A child safety lock according to claim 1, wherein the carriage frames are arranged in sliding guides formed in a housing.

6. A child safety lock according to claim 1, wherein movement of each of the carriage frames is prevented by the secondary lock in the form of a pin which is biased by a pin spring to engage in a corresponding hole in the carriage frames to prevent their movement.

7. A child safety lock according to claim 6, wherein a top button is provided at a top of a housing of the catch part, wherein said top button may be pressed by the user in order to release the pin.

8. A child safety lock according to claim 7, wherein a pin spring is engaged with and exerts a bias on the pin and wherein pressing of the top button causes a pair of sliders respectively arranged laterally to either side of the pin spring to move downwardly to engage outer parts of a pair of rockers which are mounted on respective pivots and causes upward movement of inner parts of the pair of rockers against an underside of an enlarged head of the pin to move the pin against the bias of the pin spring.

9. A child safety lock according to claim 7, wherein downward movement of the top button causes the pin to move out of the hole and out of engagement with the carriage frames.

10. A child safety lock according to claim 9, wherein, in order to release the catch part, a user is required to first press the top button in a first direction, followed by pressing the side buttons together in inwardly opposed directions toward each other, whilst the top button continues to be pressed.

11. A child safety lock according to claim 1, wherein the latch part includes a supporting wall arranged orthogonally to a tongue.

12. A child safety lock according to claim 11, wherein the latching protrusion is arranged orthogonally to the supporting wall.

13. A child safety lock according to claim 11, wherein the tongue of the latch part includes diametrically opposed flanges which correspond with a groove of a frame attachment member.

14. A child safety lock according to claim 13, wherein the frame attachment member includes an enlarged web which comprises an attachment surface.

15. A child safety lock according to claim 14, wherein the enlarged web extends orthogonally to the groove.

* * * * *